July 1, 1952 W. W. HANSEN 2,602,137
HIGH-FREQUENCY CONVERTER APPARATUS
Original Filed Oct. 23, 1941
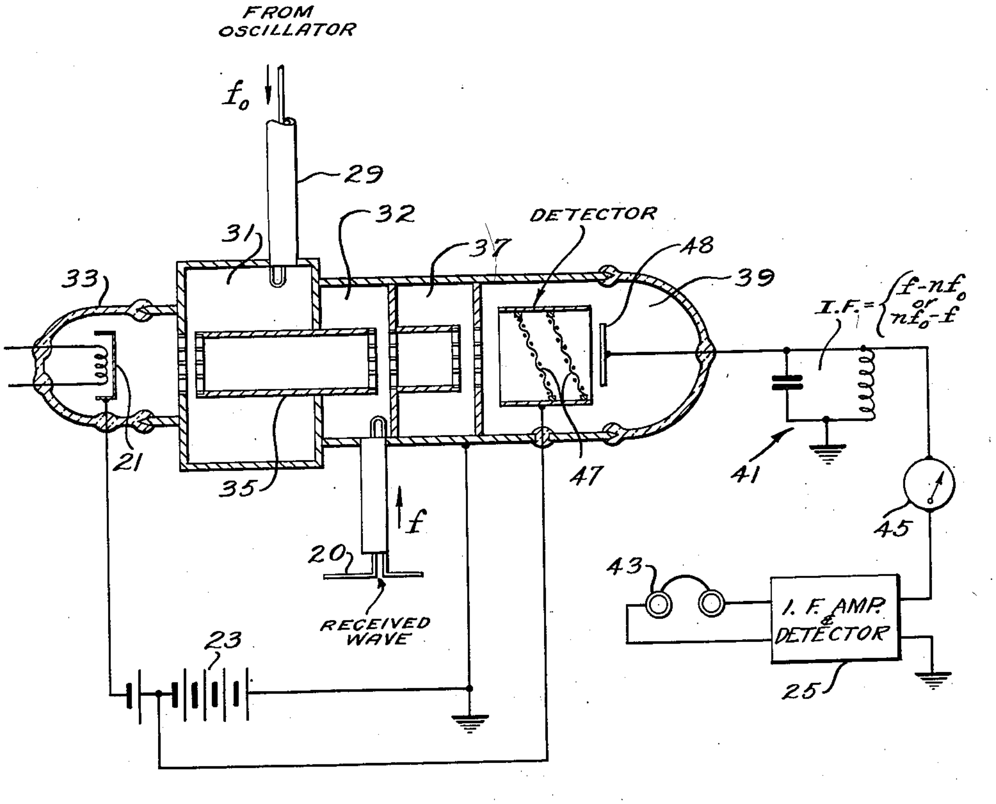
INVENTOR
WILLIAM W. HANSEN
BY Paul B. Hunter,
ATTORNEY Patented July 1, 1952

2,602,137

UNITED STATES PATENT OFFICE 2,602,137

HIGH-FREQUENCY CONVERTER APPARATUS

William W. Hansen, Stanford University, Calif., assignor to The Sperry Corporation, a corporation of Delaware Original application October 23, 1941, Serial No. 416,170. Divided and this application October 29, 1946, Serial No. 706,304

15 Claims. (Cl. 250—20)

The present invention relates to the art including superheterodyne radio receivers and frequency changers especially adapted for use with ultra-high and super-high frequency waves in the portion of the frequency spectrum above 300 megacycles per second, usually termed the microwave region. The present application is a division of parent application Serial No. 416,170, filed October 23, 1941, now Patent No. 2,425,738.

In conventional receivers, including those of the microwave type, it is customary to use a superheterodyne arrangement in which the received wave is heterodyned against a local oscillator wave to produce an intermediate frequency wave whose frequency is equal to the difference between the frequencies of the received and local oscillator waves. For microwave receivers this necessitates the generation of a local oscillator wave differing in frequency relatively slightly from the received wave and yet having good frequency stability in order that the intermediate frequency shall not vary too widely.

As discussed in the above-mentioned parent application a desirable method for producing the local oscillator frequency is to generate a stabilized lower frequency (such as by a crystal-controlled oscillator) and to multiply this lower frequency by successive stages to reach the desired microwave frequency. In the prior art, this has necessitated the use of a microwave frequency multiplier for the last multiplication step, in addition to and separate from the tuned microwave mixer for heterodyning the resultant local oscillator wave with the received wave. According to the present invention, such receiver or frequency changer systems are greatly simplified by the use of a single structure serving simultaneously as the microwave frequency multiplier and as a mixer, thereby reducing the number of resonant circuits or cavity resonators in the system.

Accordingly, it is an object of the present invention to provide simplified receiver or frequency changer apparatus suitable for use with microwave frequencies.

It is another object of the present invention to provide improved apparatus of the above mentioned type in which the functions of frequency multiplier and detector or mixer are combined.

Other objects and advantages will become apparent from the following specification taken in connection with the accompanying single figure of drawing, which is a schematic representation of an electron discharge device and circuit therefor embodying the principles of the present invention.

Referring to the single sheet of drawing, there is shown a heterodyne type receiver including an electron discharge device 33 having three cavity resonators 31, 32 and 37 successively traversed by an electron stream from a cathode 21 under the influence of an accelerating voltage source 23 connected between cathode 33 and the resonators. Resonator 31 is coupled to a source of relatively low fundamental frequency energy (for example, about 300 megacycles per second) which it is desired to multiply to produce the local oscillator wave (which may have a frequency near 3000 megacycles per second, for example), this resonator 31 being tuned to this lower frequency.

Resonator 32, separated from resonator 31 by drift tube 35, is coupled to the source of energy which it is desired to beat against the local oscillator wave, this source being shown illustratively as an antenna 20. Resonator 32 is selective or resonant broadly enough to be excited to oscillation both at frequency $f$ of the received wave and at the desired multiple or harmonic $nf_0$ of the fundamental frequency $f_0$ supplied to resonator 31. In this way, resonators 31 and 32 operate as a frequency multiplier to produce oscillations of frequency $nf_0$ in resonator 32, upon which oscillations are superposed the oscillations of received frequency $f$ derived from antenna 20 or other source used in place thereof. Resonator 37 is tuned in the same manner as resonator 32 and provides a stage of amplification for both waves of frequencies $f$ and $nf_0$.

Located in the path of the electron stream beyond resonator 37 is a detector structure having a pair of slanted grids 47 maintained at a potential near that of cathode 21 by their connection to a suitable tap on accelerating voltage source 23 and a plate or detector electrode 48 located in the stream path beyond grids 47. Plate 48 is coupled to a tuned circuit 41 tuned to the desired intermediate frequency, which in this case is equal to the difference between the received frequency $f$ and the multiple $nf_0$ of the fundamental frequency input $f_0$. The slanted grids act to deflect lower-velocity electrons from their path generally along the tube axis and to collect a considerable percentage of such electrons. The higher-velocity electrons proceed through grids 47 with substantially less deflection or path bending, and impinge upon plate or collector electrode 48 to be collected thereby. The elements 47 and 48 thus cooperate as a sensitive electron velocity discriminator system, with non-linear responsiveness to the electron beam as a function of electron velocity. When operated at ground potential or at a negative bias voltage, plate 48 itself performs as a non-linear velocity discriminator, but with less sensitivity and sharpness of velocity selectivity than when used in conjunction with the biased slanted grids 47.

As the electron velocity in the stream beyond resonator 37 varies as the resultant of a substantial velocity modulation component at frequency $nf_0$ and a generally weaker velocity modulation component at frequency $f$, the velocity waveform has substantially the character of a wave of frequency $nf_0$ modulated by a signal whose frequency is equal to the difference between $f$ and $nf_0$. The electron current collected by plate 48, and hence applied to the tuned intermediate frequency system 41 varies non-linearly in response to these resultant velocity variations, so that it yields a net output voltage, in the intermediate frequency amplifier input circuit, corresponding to the "demodulation" or "detection" of the above-described waveform, and thus having its principal component equal in frequency to the difference between $nf_0$ and $f$. The tuned circuit 41 serves as a filter across which appears the intermediate frequency wave, which may be supplied to an amplifier and detector 25 to actuate a telephone receiver 43 or other type of signal utilization device in conventional manner. Indicator 45 may be utilized to line up and tune the various stages of tube 33, using the local oscillations derived from line 29 for this purpose.

In operation, the electron stream leaving resonator 37 has current components of frequencies $f$ and $nf_0$. The detector 47, 48 beats these currents to produce a difference or intermediate frequency which excites the tuned circuit 41 to actuate the receiver or utilization device 43.

Accordingly, the single electron discharge device 33 simultaneously operates as a frequency multiplier, as an added stage of amplification, and as a mixed or detector thereby permitting relatively simple operation in superheterodyne reception or frequency conversion for waves in the microwave region of the frequency spectrum.

According to a modified arrangement, resonator 31 is tuned to frequency $f_0$, resonator 32 is tuned to frequency $f$, and resonator 37 is tuned either to frequency $nf_0$ or broadly enough to oscillate both at frequency $nf_0$ and at frequency $f$. In this arrangement, resonators 31 and 37 operate as a frequency multiplier to produce a beam current component of frequency $nf_0$. Resonators 32 and 37 may operate as an amplifier to produce a beam current component of frequency $f$. Then the detector produces the beat or intermediate frequency, as before.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A receiver for high frequency waves comprising means including an electron emitter for producing an electron beam, means for varying the velocity of electrons of said beam, said velocity varying means including a pair of cavity resonators having electron-permeable gaps, said gaps being positioned to successively receive said beam, means for applying a received wave to one of said resonators, means for applying a locally generated electromagnetic wave to the other of said resonators, and means for detecting the resultant velocity variations of said beam, wherein an intermediate frequency output may be derived from said detecting means.

2. Apparatus as in claim 1 wherein said means for applying a locally generated wave includes a coupling loop.

3. A receiver as in claim 1 wherein one of said resonators has a resonant frequency substantially equal to a harmonic of that of the other of said resonators, said received electromagnetic wave having a frequency which differs from said harmonic by an amount equal to said intermediate frequency, whereby said produced intermediate frequency is equal to the difference frequency of said received wave frequency and an integral multiple of said local wave frequency.

4. A receiver for high frequency waves comprising electron discharge tube means for forming an electron beam, a pair of cavity resonators each having an electron-permeable gap, said gaps being disposed to receive said electron beam, means for supplying a received wave to one of said resonators to velocity vary the electrons of said beam at the frequency of said received wave, means for supplying a locally generated electromagnetic wave to the other of said resonators to further velocity vary the electrons of said beam at the frequency of said locally generated wave, means for detecting the velocity variations of said beam, and means for deriving from said detecting means an output intermediate frequency of a value corresponding to the difference between said received wave frequency and a harmonic of said local wave frequency.

5. Apparatus as in claim 4 wherein said means for supplying said received wave includes a coupling loop.

6. A receiver for high frequency waves, comprising a first resonant circuit having a first resonant frequency, a second resonant circuit having a second resonant frequency differing by a predetermined intermediate frequency from a multiple of said first resonant frequency wherein the frequency multiplication factor is an integer greater than one, means for producing an electron beam, first electrode means positioned along the path of said beam and coupled to said first resonant circuit, second electrode means positioned along the path of said beam beyond said first electrode means with respect to said means for producing an electron beam and coupled to said second resonant circuit, whereby said resonant circuits are adapted to vary the velocity of the electrons of said beam, means for applying a received wave of said second resonant frequency to said second resonant circuit, means for applying a locally generated wave of said first resonant frequency to said first resonant circuit, means for detecting the resultant velocity variations of said beam, and means connected to said detecting means for deriving an output therefrom at said predetermined intermediate frequency.

7. Apparatus as in claim 6 wherein said first and second resonant circuits are a pair of cavity resonators.

8. A receiver for high frequency waves comprising a first cavity resonator having a first resonant frequency, a second cavity resonator having a second resonant frequency and having a frequency characteristic of a predetermined band width, means for producing an electron beam, said resonators being adapted to maintain standing electromagnetic waves therein and having electron-permeable regions arranged to successively receive said electron beam to successively vary the velocity of the electrons of said beam, means for coupling a locally generated wave to said first resonator, means for coupling a received wave to said second resonator, said predetermined band width including a frequency equal to the frequency of said received wave and also including a frequency equal to a harmonic of said first resonant frequency, and means including velocity-selective means located in the path of said beam for detecting the resultant velocity variations of said beam for deriving therefrom an intermediate frequency signal equal to the difference between said harmonic and said received wave frequency.

9. Apparatus as in claim 8 wherein said second resonant frequency is a multiple of said first resonant frequency.

10. Apparatus as in claim 8 wherein said second resonant frequency differs from a multiple of said first resonant frequency by an amount equal to said intermediate frequency.

11. Apparatus as in claim 8 wherein amplifying means are included, said amplifying means comprising a cavity resonator having a frequency characteristic of said predetermined band width, and interposed between said second resonator and said detecting means.

12. A receiver for high frequency waves comprising means for producing an electron beam; first, second and third cavity resonators positioned in cascade for successive interaction with said beam; said resonators each having an electron-permeable region disposed along the path of said beam, said first resonator having a selected resonant frequency, means for supplying a locally generated electromagnetic wave to said first resonator, one of said second and third resonators having a frequency characteristic of a predetermined bandwidth, means for applying an electromagnetic wave having a frequency different from the frequency of said locally generated wave to said second resonator, said predetermined bandwidth including a frequency equal to the frequency of said applied wave and also including a frequency equal to a harmonic of said selected resonant frequency, and means for detecting the resultant velocity variations of said beam, whereby an intermediate frequency output may be derived from said detecting means.

13. Apparatus as in claim 12 wherein said second resonator has a resonant frequency equal to a harmonic equal to said first resonant frequency, said third cavity resonator having said frequency characteristic of said predetermined bandwidth, whereby said first and third resonators function as a multiplier and said second and third resonators function as an amplifier.

14. Apparatus as in claim 12 wherein both said second and third cavity resonators have frequency characteristics of said predetermined bandwidth, whereby said first and second cavity resonators function as a multiplier and said second and third cavity resonators function as an amplifier.

15. A receiver for high frequency waves comprising means for producing an electron beam, a first cavity resonator having a first resonant frequency, a second cavity resonator having a second resonant frequency differing from said first resonant frequency, a third cavity resonator having a third resonant frequency harmonically related to said first resonant frequency, said cavity resonators being arranged in cascade for successive interaction with said electron beam, means for coupling a locally generated wave to a first resonator, means for coupling a received wave to said second resonator, and means including velocity-selective means located in the path of said beam for detecting the resultant velocity variations of said beam for deriving therefrom an intermediate frequency signal equal to the difference between said third resonant frequency and said received wave frequency.

WILLIAM W. HANSEN.

REFERENCES CITED

The following references are of record in the file of this patent:

UNITED STATES PATENTS

| Number | Name | Date |
|---|---|---|
| 2,190,515 | Hahn | Feb. 13, 1940 |
| 2,260,844 | Thomas | Oct. 28, 1941 |
| 2,281,935 | Hansen et al. | May 5, 1942 |
| 2,293,151 | Linder | Aug. 18, 1942 |
| 2,403,025 | Samuel | July 2, 1946 |
| 2,406,370 | Hansen et al. | Aug. 27, 1946 |
| 2,409,608 | Anderson | Oct. 22, 1946 |
| 2,410,840 | Samuel | Nov. 12, 1946 |
| 2,411,289 | Mouromtseff et al. | Nov. 19, 1946 |